(12) United States Patent
Zhao et al.

(10) Patent No.: US 10,866,575 B2
(45) Date of Patent: Dec. 15, 2020

(54) THREE-DIMENSIONAL (3D) OBJECT PRINTING SIMULATOR

(71) Applicant: Hewlett-Packard Development Company, L.P., Houston, TX (US)

(72) Inventors: Yan Zhao, Palo Alto, CA (US); Hokeun Kim, Palo Alto, CA (US); Lihua Zhao, Palo Alto, CA (US); Jun Zeng, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 139 days.

(21) Appl. No.: 15/764,845

(22) PCT Filed: Jan. 25, 2016

(86) PCT No.: PCT/US2016/014742
§ 371 (c)(1),
(2) Date: Mar. 29, 2018

(87) PCT Pub. No.: WO2017/131613
PCT Pub. Date: Aug. 3, 2017

(65) Prior Publication Data
US 2018/0275636 A1 Sep. 27, 2018

(51) Int. Cl.
*G05B 19/00* (2006.01)
*G05B 19/4099* (2006.01)
(Continued)

(52) U.S. Cl.
CPC ........ *G05B 19/4099* (2013.01); *B29C 64/153* (2017.08); *B29C 64/386* (2017.08);
(Continued)

(58) Field of Classification Search
CPC ...... G05B 19/4099; G05B 2219/49007; G05B 2219/40311; G05B 2219/35134;
(Continued)

(56) References Cited

U.S. PATENT DOCUMENTS

| 10,409,933 B2 * | 9/2019 | Komzisk ................. G06T 19/00 |
| 2010/0174392 A1 | 7/2010 | Fink et al. |

(Continued)

FOREIGN PATENT DOCUMENTS

| CN | 105034139 | 11/2015 |
| EP | 2899012 A1 | 7/2015 |

(Continued)

OTHER PUBLICATIONS

Sturm, L.D. et al.; 2014; "Cyber-physical Vulnerabilities in Additive Manufacturing Systems"; http://sffsymposium.engr.utexas.edu/sites/default/files/2014-075-Sturm.pd.

(Continued)

*Primary Examiner* — Michael D Masinick
(74) *Attorney, Agent, or Firm* — Fabian VanCott (57) ABSTRACT

A three-dimensional (3D) object printing process-level simulator including, in an example, a layer module for modeling a plurality of layers of a simulated 3D object to be built and a printing device controller to receive a number of simulated values from the layer module to simulate a 3D object printing process and adjust the 3D object printing process based on physical characteristics of a printing device associated with the printing device controller. A cyber-physical three-dimensional (3D) object printing simulator including, in an example, a printing device including a processor to send instructions describing how a simulated 3D object is to be printed and a layers module to simulate heat transfer from a plurality of layers in the 3D object to be printed based at least a density of the plurality of layers.

19 Claims, 8 Drawing Sheets

(51) Int. Cl.
  *B33Y 50/00*    (2015.01)
  *B29C 64/153*   (2017.01)
  *B29C 64/386*   (2017.01)
  *B22F 3/105*    (2006.01)
  *H04N 1/60*     (2006.01)
(52) U.S. Cl.
  CPC .......... *B33Y 50/00* (2014.12); *B22F 3/1055* (2013.01); *B22F 2003/1057* (2013.01); *G05B 2219/49007* (2013.01); *H04N 1/6011* (2013.01)
(58) Field of Classification Search
  CPC ..... B29C 64/386; B29C 64/153; B33Y 50/00; B22F 2003/1057; B22F 3/1055; H04N 1/6011
  See application file for complete search history.

(56) References Cited

U.S. PATENT DOCUMENTS

| | | | |
|---|---|---|---|
| 2014/0019104 A1 | 1/2014 | Martinez Canedo et al. | |
| 2014/0099617 A1 | 4/2014 | Tallman | |
| 2014/0324204 A1* | 10/2014 | Vidimce | B29C 64/386 |
| | | | 700/98 |
| 2015/0251247 A1 | 9/2015 | Monsheimer | |
| 2015/0269289 A1 | 9/2015 | Kim et al. | |
| 2015/0269290 A1* | 9/2015 | Nelaturi | G06T 17/10 |
| | | | 703/6 |
| 2015/0310148 A1 | 10/2015 | Lacaze et al. | |
| 2015/0360419 A1 | 12/2015 | Willis et al. | |
| 2016/0096318 A1* | 4/2016 | Bickel | B29C 64/00 |
| | | | 264/40.1 |
| 2016/0151979 A1* | 6/2016 | Urban | B29C 64/393 |
| | | | 264/308 |
| 2016/0185043 A1* | 6/2016 | Klappert | B29C 67/0088 |
| | | | 264/40.1 |
| 2016/0246908 A1* | 8/2016 | Komzsik | G06T 17/10 |
| 2017/0087767 A1* | 3/2017 | Grewell | B29C 64/386 |
| 2017/0151722 A1* | 6/2017 | Prasad | B29C 64/165 |
| 2018/0126671 A1* | 5/2018 | Wilenski | B22F 3/1055 |

FOREIGN PATENT DOCUMENTS

| | | |
|---|---|---|
| EP | 2926982 A1 | 10/2015 |
| JP | 2015-138471 A | 7/2015 |
| WO | WO-2014144677 | 9/2014 |
| WO | WO-2015095785 A1 | 6/2015 |

OTHER PUBLICATIONS

Babis Schoinochoritis, "Simulation of metallic powder bed additive manufacturing processes with the finite element method: A critical review" Sep. 17, 2014, XP008181611.

Keller, "Thermo-Mechanical Simulation of Additive Layer Manufacturing of Titanium Aerospace Structures", XP055327673.

* cited by examiner

THREE-DIMENSIONAL (3D) OBJECT PRINTING SIMULATOR

BACKGROUND

Three-dimensional (3D) printing is an additive printing process used to make three-dimensional solid objects from a digital model. 3D printing is often used in rapid product prototyping, mold generation, and mold master generation. 3D printing techniques are considered additive processes because they involve the application of successive layers of material. Materials used in 3D printing often use curing or fusing processes and machines. For some materials, this may be accomplished using heat-assisted extrusion or sintering, and for other materials may be accomplished using digital light projection technology.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Further to that described above, examples of the three-dimensional (3D) printing methods include light area processing. During light area processing, a layer of a sinterable material is laid down at a target location. A coalescent dispersion including binding agents is selectively deposited in contact with selected regions of the sinterable material. At least one layer is then exposed to radiation. This results in the selected regions of the sinterable material where the binding agent is deposited being fused and hardened to become a layer of a 3D object. The coalescent dispersions may include a water-soluble or a water-dispersible infrared or near-infrared binding agent. In some examples, these binding agents are capable of penetrating into a layer of the sinterable material and passivating onto the exterior surface of the sinterable material. These binding agents are also capable of absorbing electromagnetic radiation and converting the absorbed electromagnetic radiation to thermal energy, which in turn melts or sinters the sinterable material that is in contact with the binding agent. This causes the sinterable material to fuse, bind, and/or cure, to form the layer of the 3D object.

A factor that determines the quality of produced 3D objects is the thermal control of printed part. A number of factors affecting the sinterable material's thermal profile and the interrelation between those factors may be relatively complicated. Some of these factors include how the printing device processes the sinterable material, physical/chemical characteristics of the sinterable material and 3D printing device's operating conditions.

The present specification describes a system, method, and device that can simulate printing device processes and physical/chemical reactions of the sinterable materials. This is done, in one example, in order to predict the thermal situation of deposited layers. Potential use of this system, method, and device includes enhancing the design of the printing device, exploring different options of hardware components (e.g., different types of lamps) before engaging in real-life production of the 3D object, and design and test firmware control schemes (e.g., waveforms that drive lamp, and/or servo-motors for various moving parts). Additionally, use of the described system, method, and device may help in the development and optimization of 3D printing processes as well as exploring future sinterable material to build better and higher quality 3D objects.

The present specification describes a three-dimensional (3D) object printing process-level simulator including, in an example, a layer module for modeling a plurality of layers of a simulated 3D object to be built and a printing device controller to receive a number of simulated values from the layer module to simulate a 3D object printing process and adjust the 3D object printing process based on physical characteristics of a printing device associated with the printing device controller.

The present specification also describes a cyber-physical three-dimensional (3D) object printing simulator including, in one example, a printing device including a processor to send instructions describing how a simulated 3D object is to be printed and a layers module to simulate heat transfer from a plurality of layers in the 3D object to be printed based on at least a density of the plurality of layers. In an example, the layers module may simulate heat transfer from a plurality of layers in the 3D object to be printed based on the density of any number of layers, the temperature of any number of the layers, radiant heat from any of the number of layers, as well as any heat lost to ambient from any of the number of layers.

The present specification further describes a method of simulating the printing of a three-dimensional (3D) object including, in an example, receiving, at a controller, a configuration file describing the parameters during a 3D object printing process, an environment file describing the characteristics of a sinterable material to be used during a 3D printing process, and a 3D object image file describing the layout of a number of layers of the 3D object, simulating the printing of the 3D object, and generating layer temperature data, density data, and execution time of the 3D printing process.

As used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods.

It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
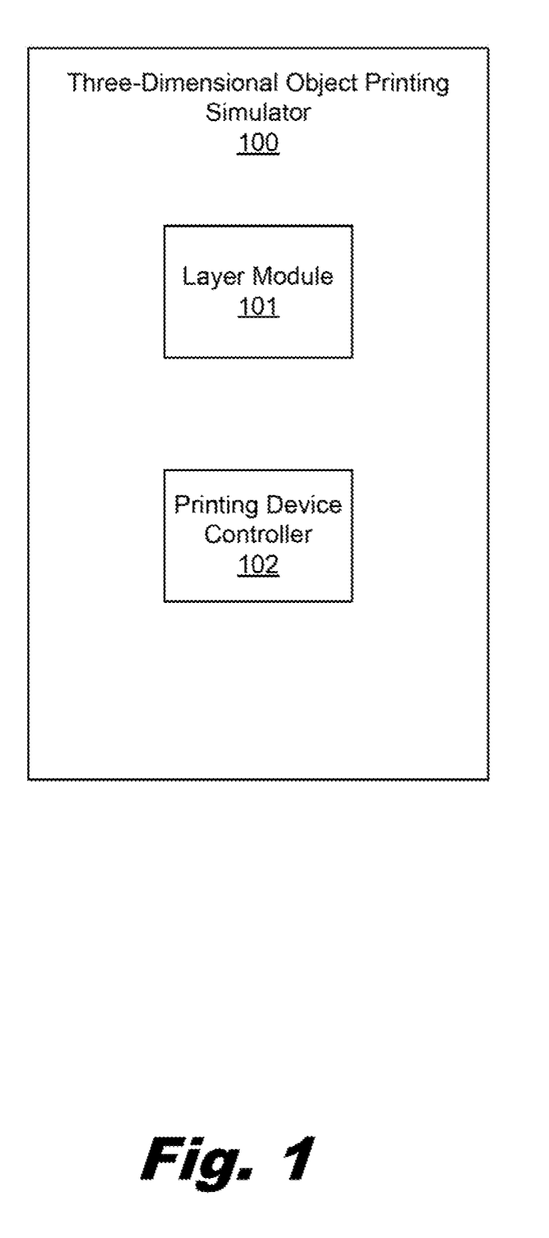
FIG. 1 is a block diagram of a three-dimensional (3D) object printing process-level simulator according to an example, of the principles described herein.

Turning now to the figures, FIG. 1 is a block diagram of a three-dimensional (3D) object printing process-level simulator (100) according to an example, of the principles described herein. The three-dimensional (3D) object printing simulator (100) includes a layer module (101) and a printing device controller (102). As will be described in more detail below, the layer module (101) models a number of layers of a simulated 3D object to provide the simulator with simulated values based on actions provided by the printing device controller (102). The simulated values are discrete because they are sampled from the layer module (101). In an example, these simulated values are provided to the simulator in a continuous manner while each layer if being simulated.

Application of, an example, cyber-physical systems for this process-level simulation helps to model the cyber part of the three-dimensional (3D) object printing process-level simulator including the process controls and computations as will be described below. Additionally, the cyber-physical systems for this process-level simulation helps to model the physical part of the three-dimensional (3D) object printing process-level simulator including the mechanical movement of actuators and the creation of a thermal model of materials such a powered used in the fabrication process. This process also handles the conversion of discrete signals and signals internally.

These simulated values describe, in one example, the temperature of any number of layers of the simulated 3D object after layers of sinterable material is laid down, coalescent dispersion and binding agents are dispersed on the sinterable material, and electromagnetic radiation is applied to the layers. In an example, the layer module (101) provides these simulated values to the 3D object printing simulator (100) causing the 3D object printing simulator (100) to, via the printing device controller (102), to adjust simulated actions to print a 3D object.

In an example, users of the three-dimensional (3D) object printing simulator (100) can see the simulated values and use that information to improve the design of a 3D object by, for example, changing the sampling rate of sensors. Consequently, as will be described in more detail below, the layers module (101) may simulate values and the values may be sampled to become sensor readings. In this way, the behavior of sensors may also be simulated. The controller (102) observes these sensor readings (which is also true in real life 3D object printing situations) and reacts to those sensor readings. Consequently, sensor readings are part of values that can be observed by the controller (102).

In an example, the simulated values are a result of an initial simulated action taken by the printing device controller (102). The printing device controller (102) causes actions to be sent to the layer module (101) in order to begin and continue the simulation of building a 3D object. These actions trigger or induce physical and/or chemical reactions in the layers module (101). The action may include, for example, a preheating action, a sinterable material deposition action, a binding agent jetting action, a fusing action, and a recoating action, among others. Each of these actions, when provided to the layers module (101) may cause changes in the simulated values provided by the layers module (101) to the printing device controller (102).

In one example, the layers module (101) may be a program unit that is discrete and identifiable with respect to compiling, combining with other units, and loading. In an example, the layers module (101) may be in the form of computer usable program code that, when executed by a processor, may model a number of layers of a simulated 3D object build, receive actions to execute based on a 3D image file, and provide simulated values to the printing device controller (102). In an example, the layers module (101) may be an ASIC that models a number of layers of a simulated 3D object build, receives actions to execute based on a 3D image file, and provides simulated values to the printing device controller (102). Although FIG. 1 shows the layer module (101) and printing device controller (102) as both being part of the 3D object printing simulator (100), the present specification contemplates that the layer module (101) and printing device controller (102) are present in separate and cooperating computing devices with each of these computing devices communicating over a network to accomplish the methods described herein.

Figure 2:
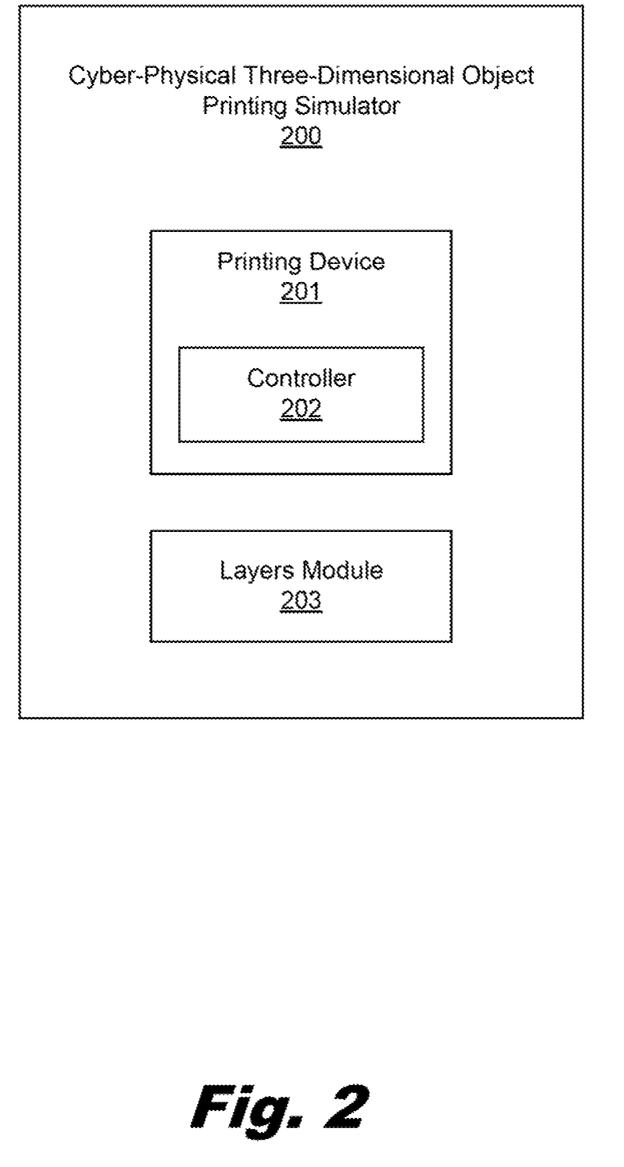
FIG. 2 is a block diagram of a cyber-physical three-dimensional (3D) object printing simulator according to an example of the principles described herein.

FIG. 2 is a block diagram of a cyber-physical three-dimensional (3D) object printing simulator (200) according to an example of the principles described herein. The cyber-physical three-dimensional (3D) object printing simulator (200) may include a printing device (201) including a controller (202) and a layers module (203). The cyber-physical three-dimensional (3D) object printing simulator (200) may be a cyber-physical device including collaborating computational elements (the printing device's (201) control and processes) controlling physical entities (sinterable materials, binding agents, electromagnetic radiation source, among others). The cyber parts may trigger simulated physical and/or chemical reactions of the physical parts through printing processes while also perceiving a current simulated status of the physical parts (e.g. surface layer temperature) through simulated sensors.

As described above, the controller (202) of the printing device (201) may cause actions to be generated causing physical and/or chemical reactions to the simulated layers of the 3D object in the layers module (203). Simulated values may be provided by the layers module (203) to the controller (202) for the controller (202) to perceive the status of the simulated layers and, in one example, adjust characteristics of actions to be sent back to the layers module (203).

During the simulations, the controller (202) directs any number of simulated layers of the 3D object to be created while receiving simulated values from the layers module (203). The number of layers may vary and, in one example, the cyber-physical three-dimensional (3D) object printing simulator (200) may provide suggestions on how to improve the 3D object printing process by, for example, adjusting the speed of various components of the physical 3D printing device (201), the types of sinterable material to use, the type of binding agent to use, the amount and type of electromagnetic radiation to apply to each of the individual layers, and the cooling period between application of layers, among other characteristics of the printing process. This allows a user of the cyber-physical three-dimensional (3D) object printing simulator (200) to adjust different parameters of the 3D object printing process before a single 3D object is actually printed. As a result, 3D printing materials may be conserved, physical printing time may be reduced, and experimental design using alternative sintering materials and binding agents may be run.

Figure 3:
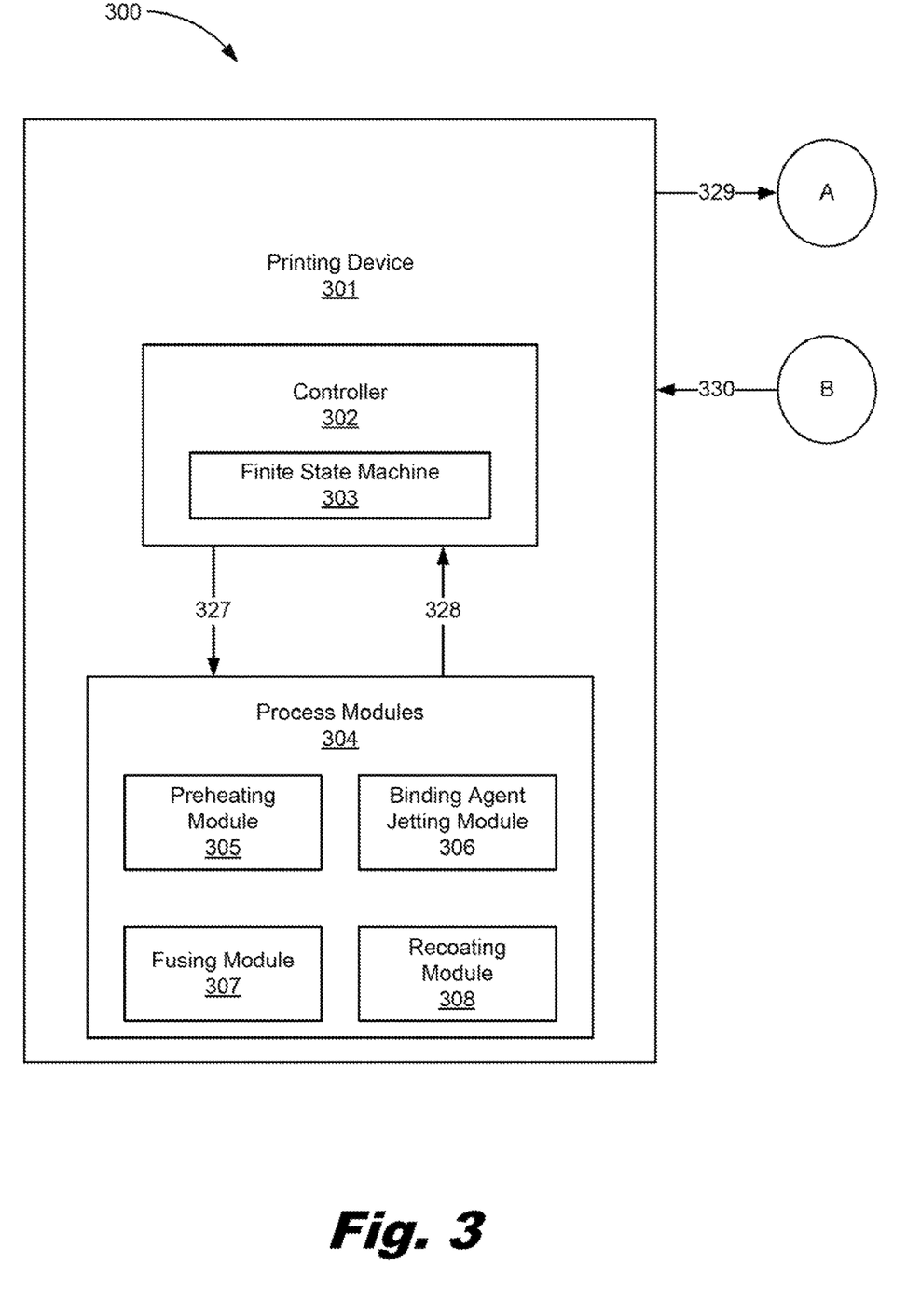
FIGS. 3 and 4 are block diagrams of a 3D printing simulation system according to an example of the principles described herein.
Figure 4:
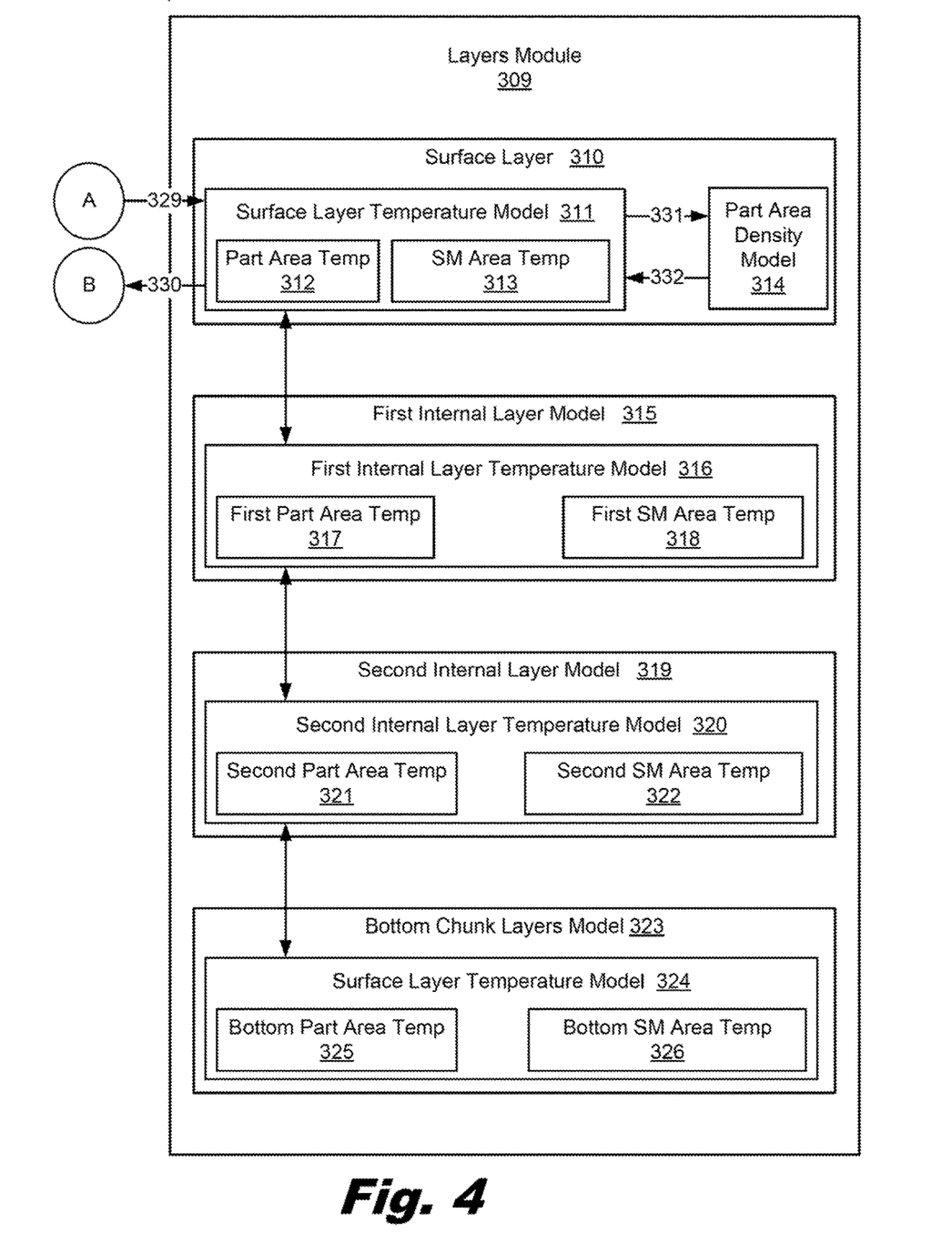

FIGS. 3 and 4 are block diagrams of a 3D printing simulation system (300) according to an example of the principles described herein. As mentioned above, the 3D printing simulation system (300) may include a printing device (FIG. 3, 301) and a layers module (FIG. 4, 309). In an example, the printing device (FIG. 3, 301) may include a controller (302). In an example, the controller (302) may be separate from the printing device (FIG. 3, 301) and may be a processor communicatively coupled to the printing device (FIG. 3, 301) via, for example, a network. As will be described herein, in one example, the printing device (FIG. 3, 301) may not perform the fabrication of a 3D object and instead, via the controller (302), engage in a simulated fabrication of a 3D object. In this example, aspects and characteristics of the printing device (FIG. 3, 301) may be used by the controller (302) as parameters for the simulated printing process. Some of these aspects and characteristics of the printing device (FIG. 3, 301) may include the type and capabilities of the electromagnetic source to provide the electromagnetic radiation during a curing or sintering process. Additionally, an aspect or characteristic of the printing device (FIG. 3, 301) may include the speed and jetting capabilities of a binding agent jetting device such as an inkjet printhead.

The layers module (FIG. 4, 309) may take the form of an entirely hardware example or an example combining computer readable program code and hardware aspects that may all generally be referred to herein as the "layers module." In the example where the layers module (FIG. 4, 309) is a combination of computer readable program code and hardware aspects, a controller or processor may be used to execute that software. The controller (302) may be part of a general purpose computer, the printing device (FIG. 3, 301) described herein, or a special purpose computer.

The printing device (FIG. 3, 301) may include a finite state machine (303) that controls the printing device's (FIG. 3, 301) processes in modal models describing the behavior of each mode or states of the printing device (FIG. 3, 301). The finite state machine (303) may consider information received from the layers module (FIG. 4, 309) regarding any simulated printed layer and any simulated printing environments (e.g., surface temperatures of individual layers) under which the layers are being printed. As will be described, the finite state machine (303) further, under simulation, 1) directs the preheating module (305) to preheat; 2) when preheating is completed, directs the binding agent jetting module (306) to jet binding agent; 3) when agent jetting is completed, sends a command to the fusing module (307) to fuse a surface layer among the number of layers; and 4) when fusing is completed, directs the recoating module (308) to recoat a layer of the sinterable material on top of the already deposited layers.

Although FIG. 3 depicts the modules (305-308) as using a single finite state machine (303), in an example, each module (305-308) may implement their own finite state machine for the purposes described herein. This may, in an example, allow the modules to operate independently from each other as well as operate within physically different computing devices apart from each other and the printing device (301). In an example, the finite state machine (303) may direct each of the modules (305-308) while each of the individual modules (305-308) may further comprise their own respective finite state machines to direct their respective processes. In this example, the finite state machine (303) helps with the instructions received from the controller (302) while an individualized finite state machine for each of the individual modules (305-308) may help with their own processes.

As an example, a model of the printing device's (FIG. 3, 301) processes includes a fusing process where states of the process includes an idle state where a thermal array is initially unmoved and then moves to fuse (movingToFuse state) a sinterable material deposited on a supply bed of the printing device (FIG. 3, 301). The movement of the thermal array (movingToFuse state) is completed once the command for fusing process is received at the layers module (FIG. 4, 309). While sinterable material on the supply bed is subjected electromagnetic radiation heat from the thermal array (fuse state), an action is generated to the layers module (FIG. 4, 309). The thermal array moves after fusing (movingAfterFuse state) to its final position. Each process of the printing device (FIG. 3, 301) described herein may have a modal model created by the finite state machine (303).

The printing device (FIG. 3, 301) may further include a number of process modules (304) including a preheating module (305), a binding agent jetting module (306), a fusing module (307), and a recoating module (308). The controller (303) and process modules (304-308) may communicate with each other through commands (327) and completion (328) signals. The controller (302) may send 3D object printing specifications (based on a 3D image file) for 3D printing to the process modules (204) and may determine the flow of the processes. The process modules (204) may generate action commands that generate physical and/or chemical reactions in the layers module (FIG. 4, 309). The controller (302) may receive status updates of a number of simulated layers of a 3D image file in the layers module (FIG. 4, 309) via simulated values produced by the layers module (FIG. 4, 309). In this manner the controller (302) with the aid of the finite state machine (303) engages in a simulation of a 3D object fabrication process.

As described above, the printing device (FIG. 3, 301) and specifically, the process modules (204-208) may send actions (329) to the layers module (FIG. 4, 309) in order to simulate physical and/or chemical reactions in the simulated layers of the layers module (FIG. 4, 309). Any number of simulated layers may be present in the layers module (FIG. 4, 309) and is based on the number of layers described in the 3D image file received and processed by the controller (302). In the example shown in FIG. 4, the layers module (FIG. 4, 309) simulates four individual types of layers: a surface layer (310), a first internal layer (315), a second internal layer (319), and bottom chunk layers (323). In order to reduce the number of simulated layers, the simulated fabrication of the 3D object include these three types of layers: surface layer (310), internal layers (315, 319), and bottom chunk layers (323). Using these three types of layers reduces the amount of processing resources used as well as eliminates those individual layers that may not contribute significantly to any changes in temperature experienced by any given layer.

The surface layer (310) represents a simulated layer of the 3D object to be fabricated that is the top most layer at any given time. The surface layer (310) may include a surface layer temperature models (311) including a part area temperature model (312) and a sinterable material area temperature model (313). The part area temperature model (312) and a sinterable material area temperature model (313) describe the average temperature of the locations on the sinterable material layer where a binding agent has been deposited and the average temperature of the simulated sinterable material where binding agent has not been deposited, respectively.

The surface layer (310) may also include a part area density model (314). The part area density model (314) may receive from the surface layer temperature models (311) a peak temperature reading (331). The peak temperature reading (331) may be used to estimate the part area density (332) by the part area density model (314). As will be described in more detail below, the density of a part of the 3D object being fabricated effects the temperature of the surface layer (310) after a new layer of sinterable material is deposited thereon.

In an example, all models described herein may be simulated by a modeling tool such as Ptolemy II. Ptolemy II is an open source set of Java packages supporting heterogeneous, concurrent modeling and design. Ptolemy II is developed by Edward Lee et al. at the University of California at Berkeley. In an example, the computer usable program code defining Ptolemy II may be executed by the controller (302) as described above to accomplish the methods and processes described herein.

The layers module (FIG. 4, 309) may further include a number of other simulated layers of a 3D object including a first internal layer (315), a second internal layer (319), and bottom chunk layers (323). Each of these layers (315, 319, and 323) include a layer temperature model (316, 320, 324) each also including a part area temperature model (317, 321, 325) and a sinterable material area temperature model (318, 322, 326). These part area temperature models (317, 321, 325) and a sinterable material area temperature model (318, 322, 326) also describe the temperature of the locations on the sinterable material layer where a binding agent has been deposited and the temperature of the simulated sinterable material where binding agent has not been deposited, respectively. All of these part area temperature models (317, 321, 325) and a sinterable material area temperature models (318, 322, 326) predict the temperature of the various portions of each of their respective layers and provide data describing these temperatures to be combined with data provided by the part area temperature model (312) and sinterable material area temperature model (313) of the surface layer temperature models (311). This data represents those temperatures of each layer that may affect temperatures of other layers in the fabrication process.

As the data is simulated by the individual modules and models of the layers module (FIG. 4, 309), the data may be accumulated and sent to the controller (302) of the printing device (FIG. 3, 301) in the form of simulated values (330). The controller (302) uses these simulated values to adjust commands (327) sent to the process modules (304). In light of these adjusted commands (327) the process modules (304) adjust actions (329) presented to the layers module (FIG. 4, 309) when simulating the building of additional layers on top of the surface layer (310). This exchange of actions (329) and simulated values (330) between the printing device (FIG. 3, 301) and the layers module (FIG. 4, 309) may continue until all layers of a simulated 3D object have been simulated to be created.

As a consequence of this simulation process, the controller (302) of the printing device (FIG. 3, 301) provides a user with helpful information regarding what can be expected when a real life 3D object is fabricated using the printing device (FIG. 3, 301). In one example, the printing device (FIG. 3, 301) may provide to a user, via a graphical user interface, a graphical representation of, for example, the temperatures of each portion of each layer during the simulated fabrication process. Additionally, the printing device (FIG. 3, 301) may provide to a user, via a graphical user interface, a graphical representation of the part area density of each part of the 3D object being fabricated. Further, the printing device (FIG. 3, 301) may provide to a user, via a graphical user interface, the fabrication time of each layer and the fabrication time of the entire 3D object. With this information, a user may adjust certain parameters of the fabrication process and run the simulation again in order to achieve a desired outcome and product. This allows a user to experiment with different types of sintering materials, binding agents, coalescing agents, and electromagnetic radiation sources, among other aspects of the devices and materials used to fabricate the 3D object.

Figure 5:
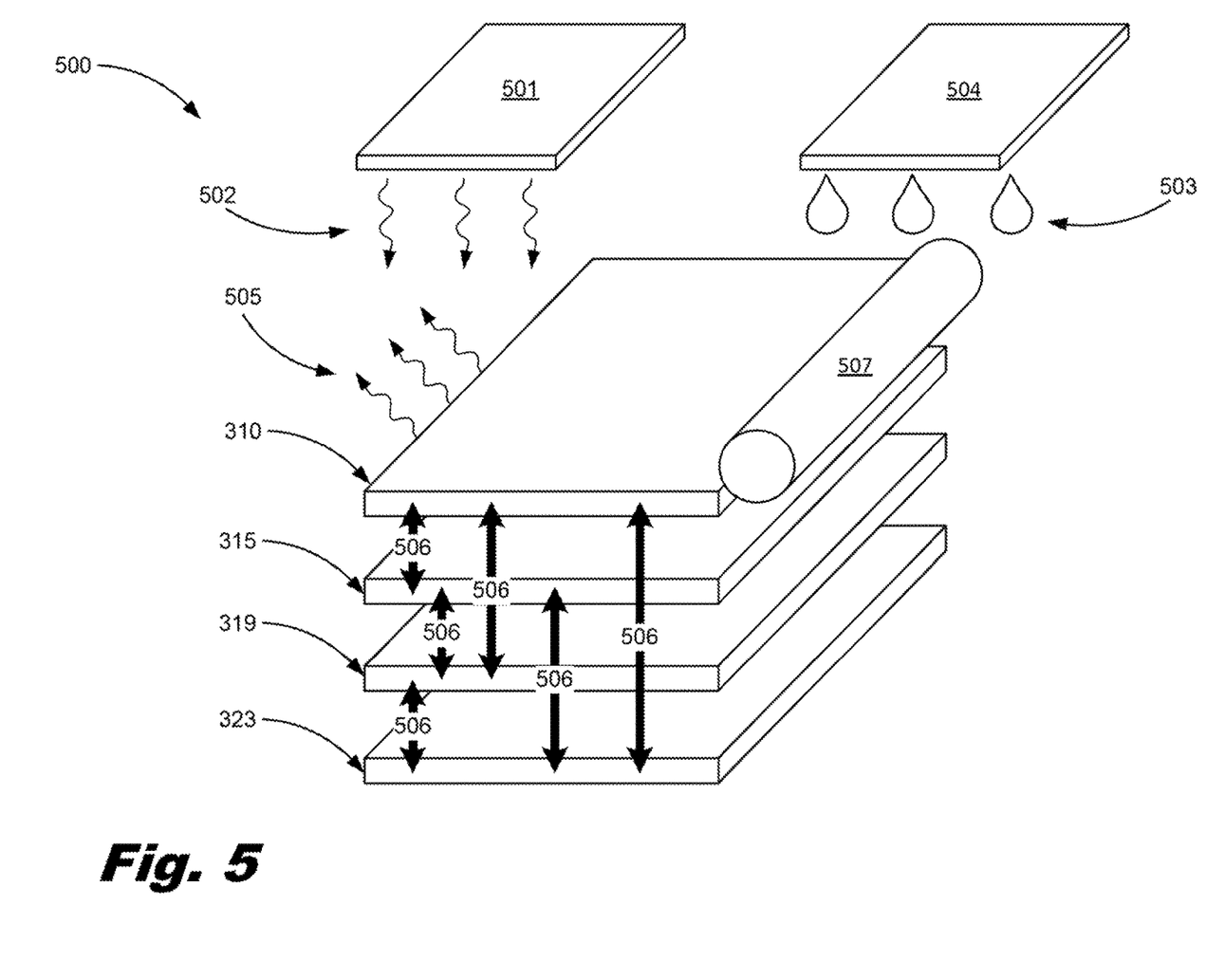
FIG. 5 is an isometric view of a number of simulated layers in a simulated 3D fabrication process conducted by a printing simulation system of FIGS. 3 and 4 according to one example of the principles described herein.

FIG. 5 is an isometric view of a number of simulated layers (500) in a simulated 3D fabrication process conducted by a printing simulation system of FIGS. 3 and 4 according to one example of the principles described herein. A number of factors may affect the temperature of each of the simulated layers (500) and specifically the surface layer (310). These factors include the radiation energy (502) originating from a preheating and fusing source (501); binding and coalescing agent (503) jetting effects from the binding and coalescing agent jetting device (504); heat lost (505) to ambient; heat transfer (506) by conduction between individual layers; and heat absorbed by the layering process (507) of a new layer of sinterable material over the surface layer (310). Some of these factors increase the amount of heat conducted into the surface layer (310) while some decrease the amount of heat felt by the surface layer (310). In either case, these changes in temperature felt by the surface layer (310) are taken into consideration by, for example, the layers module (FIG. 4, 309) and constant real-time updates on these temperatures are provided to the controller (302) of the printing device (FIG. 3, 301) as simulated values (330). In an example, time models of computation (MoC) may be used and all of the above described heat transfer factors are integrated over time to calculate the temperature of the part areas for all part area temperature models (312) as well as the sinterable material areas for all sinterable material area temperature models (313). In an example, for the internal layers (315, 319) as well as the bottom layer (323), the heat transferred by conduction (506) may still effect the temperature of the surface layer (310) even after these layers are covered with a new layer of sinterable material.

Figure 6:
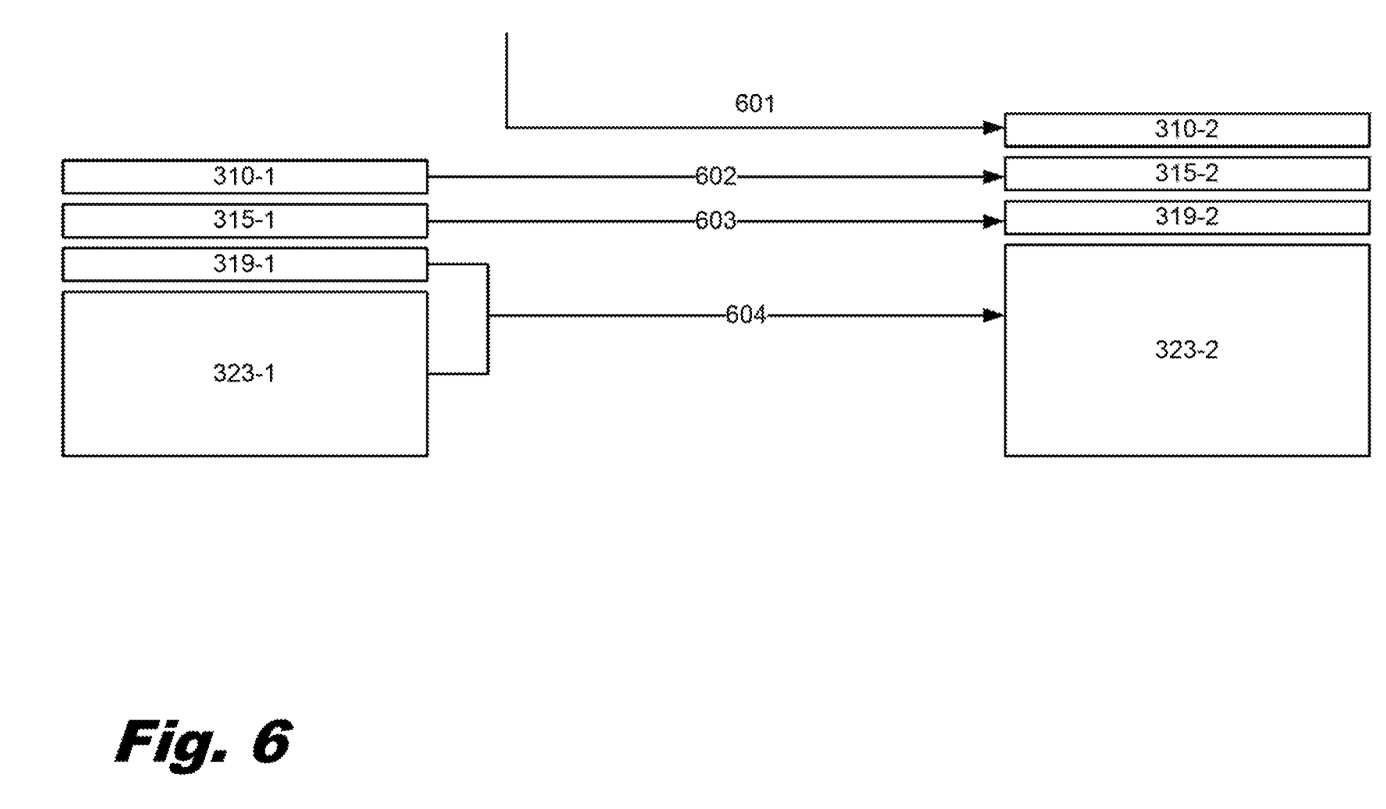
FIG. 6 is a block diagram showing a transfer of layer information from one layer to another as new simulated layers of sinterable material are laid on top of a surface layer according to one example of the principles described herein.

As described above, a number of layers may be aggregated together to form a single bottom chunk layer (323). This reduces the number of simulated layers during the simulated 3D object building process. Information regarding these different layers does change, however as new simulated layers of sinterable material are placed over the surface layer (310). FIG. 6 is a block diagram showing the transfer of this information from one layer to another as new simulated layers of sinterable material are laid on top of the surface layer (310) according to one example of the principles described herein. In an example, the layer module (FIG. 4, 309) provides to the printing device (FIG. 3, 301) all current and new layer data in real-time during the simulated 3D object fabrication.

In FIG. 6, a pre-layering set of layers (310-1, 315-1, 319-1, 323-1) is shown providing current data including temperature data to respective new layers in a post-layering set of layers (310-2, 315-2, 319-2, 323-2). The process (600) of data transfer may begin with placing (601) a new layer of sinterable material over a current surface layer (310-1). As this is done, data describing the current temperature of the surface layer (310-1) is transferred (602) to a new first internal layer (315-2) which, before the placing (601) of the new layer of sinterable material was the surface layer (310-1). At this time, the layer module (FIG. 4, 309) begins to simulate the temperature of the new layer of sinterable material and assigns this new layer of sinterable material as the new surface layer (310-2).

Similarly, the temperature associated with the first internal layer (315-1) before the placing (601) of the new layer of sinterable material is transferred (603) to a newly defined second internal layer (319-2) now being labeled as such by the layer module (FIG. 4, 309). Again, the layer module (FIG. 4, 309) begins to simulate the temperature of the new second internal layer (319-2) and provides the printing device (FIG. 3, 301) with this data in the form of simulated values (FIG. 4, 330).

The temperature associated with the second internal layer (319-1) may be averaged with the temperature associated with the bottom layers (323-1). In an example the averaging of these two layers (319-1, 323-1) may be accomplished via the following equation:

$$T = \frac{A \times T_{BL} + T_{IL2}}{A + 1}$$

where A is the number of layers forming in the bottom layers (323-1); $T_{BL}$ is the temperature of the bottom layers (323-1); and $T_{IL2}$ is the temperature of the second internal layer (319-1). Here the second internal layer (319-1) is combined with the bottom layers (323-1) to form a new bottom layer (323-2) and temperature (T) of the new aggregate layers is transferred (604) to the new bottom layer (323-2). Again, the layer module (FIG. 4, 309) begins to simulate the temperature of the new bottom layer (323-2) and provides the printing device (FIG. 3, 301) with this data in the form of simulated values (FIG. 4, 330).

A number of temperature changes occurs during this process (600). In an example, the new surface layer (310-2) may begin to heat up due to the heat conduction from the new first internal layer (315-2). Additionally, the heat capacity of the new bottom layer (323-2) increases while the conductivity decreases due to the increased distance from the surface layer (310-2).

Figure 7:
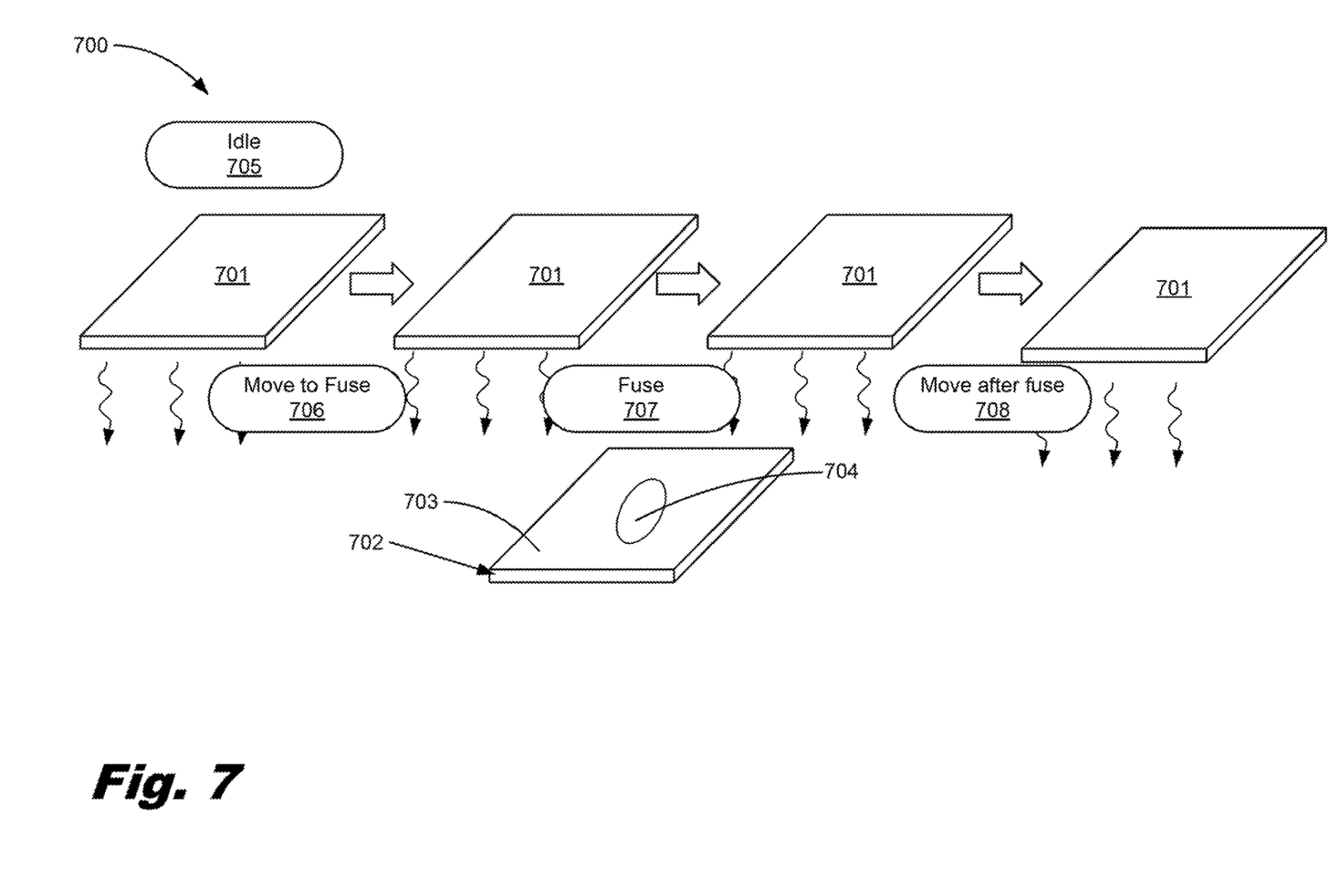
FIG. 7 is an example model of a simulated fusing process enacted by a fusing module of a printing device according to one example of the principles described herein.

In reference to FIG. 3, FIG. 7 is an example model of a simulated fusing process (700) enacted by the fusing module (FIG. 3, 307) according to one example of the principles described herein. The process (700) includes interactions between a thermal array (701) and a supply bed (702) where sinterable material (703) and coalescent dispersions and binding agents (704) are deposited. As described above, the fusing module (FIG. 3, 307) may be directed by the controller (FIG. 3, 302) to send actions to the layer module (FIG. 4, 309) in order to simulate the fabrication of a 3D object. The fusing process (700) may begin with the thermal array (701) being placed in an idle state (705) in a location away from the supply bed (702) such that no electromagnetic radiation there from comes in contact with the supply bed (702) and any sinterable material (703) and/or coalescent dispersions and binding agents (704) deposited thereon. The fusing module (FIG. 3, 307) may then, when instructed by the controller (FIG. 3, 302), send a simulated action to the layer module (FIG. 4, 309) that placed the thermal array (701) in a "move to fuse" state (706) that causes the thermal array (701) to move towards the supply bed (702). At this point the effect of heating the binding material (704) and fusing the sinterable material (703) are simulated by the layer module (FIG. 4, 309). The thermal array (701) may be made to simulate a complete fusing state (707). In real-time, simulated sensors of the fusing module (FIG. 3, 307) send temperature readings of the individual layers (310, 315, 319, 323) indicating how much electromagnetic radiation to apply and for how long the electromagnetic radiation is to be applied. Actions from the fusing module (FIG. 3, 307) may be updated under the instructions provided to the fusing module (FIG. 3, 307) by the controller (FIG. 3, 302). The fusing module (FIG. 3, 307) may then send an action to place the thermal array (701) in a move after fuse state which causes the layer module (FIG. 4, 309) to simulate the conditions under which the thermal array (701) is removed from above the supply bed (702) thereby topping the fusing process of the materials.

In addition to the above example in connection with the fusing module (FIG. 3, 307), each of the other modules (305, 306, and 308) may each present actions to the layer module (FIG. 4, 309) by the direction of the controller (FIG. 3, 302) in order to simulate other types of actions conducted during the 3D object fabrication process. Therefore, the present specification contemplates any simulated actions being presented to the layer module (FIG. 4, 309) in order to complete a simulated build of an entire 3D object.

Figure 8:
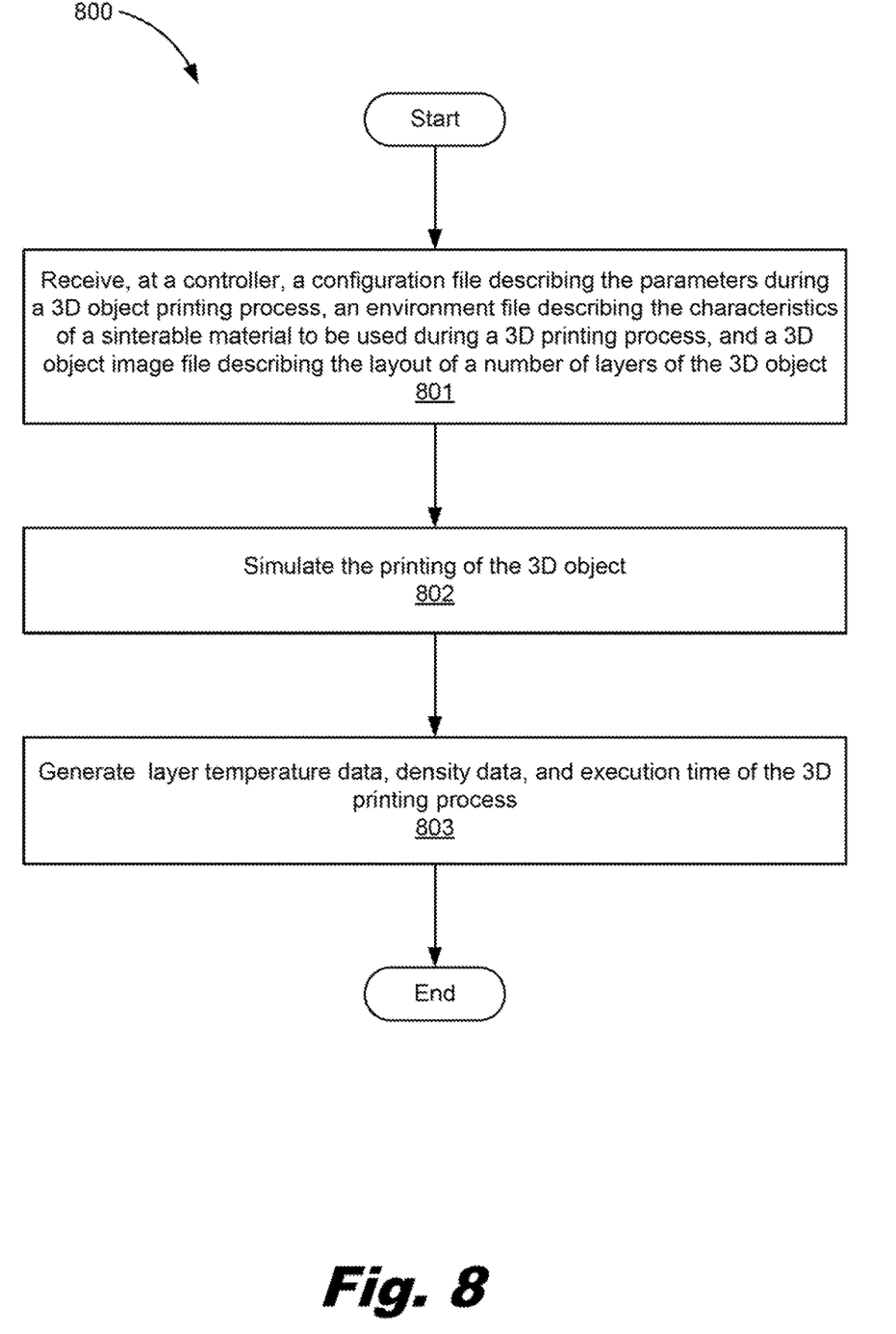
FIG. 8 is a flowchart showing a method of simulating the printing of a three-dimensional (3D) object according to one example of the principles described herein.

FIG. 8 is a flowchart showing a method (800) of simulating the printing of a three-dimensional (3D) object according to one example of the principles described herein. The method (800) may begin by receiving (801), at a controller (FIG. 3, 302), a configuration file describing the parameters during a 3D object printing process, an environment file describing the characteristics of a sinterable material to be used during a 3D printing process, and a 3D object image file describing the layout of a number of layers of the 3D object. The parameters during a 3D object printing process described in the configuration file may include preheating target temperatures, thermal array (701) speed, and the intensity of electromagnetic radiation provided by the thermal array (701), among others. The environment file may further describe characteristics of the binding agent described above.

The method (800) may continue by simulating (802) the printing process of the 3D object as described above. This is accomplished through the use of command signals (327) being presented to a process module (304). These command signals (327) direct the process modules (304) to send certain actions to the layer module (FIG. 4, 309) for the layer module (FIG. 4, 309) to implement.

The method (800) may continue by generating (803) layer temperature data, density data, and execution time of the 3D printing process. As described above, this data is generated by the layer module (FIG. 4, 309) and sent to the process modules (304) in the form of simulated values (330).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, controller (FIG. 3, 302) of the printing device (301) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a 3D object printing simulator. The described 3D object printing simulator can simulate a 3D printing process using characteristics describing any type of printing device or material used to form the 3D object. As a result of the simulation, a user may adjust parameters of the devices and materials used to achieve relatively superior results in a real-life application. This reduces the use of materials and energy in printing experimental 3D objects before adjustments are made to the materials and printing devices used. Because the present simulator aggregates any number of layers into a single bottom layer as additional layers are simulated, the processing speed may be quicker resulting in a simulation speed that is 10 orders of magnitude quicker than any other type of simulation process. Additionally, new modules may be introduced in an attempt to refine the process and a simulation of these modules may be conducted relatively quickly.

The preceding description has been presented to illustrate and describe examples of the principles described. This description is not intended to be exhaustive or to limit these principles to any precise form disclosed. Many modifications and variations are possible in light of the above teaching.

What is claimed is:

1. A three-dimensional (3D) object printing process-level simulator, comprising:
a layer module for modeling a plurality of layers of a simulated 3D object to be built; and
a printing device controller to provide characteristics of a printing device associated with the printing device controller to the layer module as parameters in modeling the plurality of layers and simulating printing of the 3D object by the layer module, the printing device controller further to receive a number of simulated continuous values from the layer module to simulate a 3D object printing process and adjust the 3D object printing process for execution by the printing device associated with the printing device controller;
wherein the layer module is to use a different model to simulate different layers of the object depending on a location of each layer within the object, the layer module to use a different model to simulate each of a surface layer, a number of intermediate layers, and a bottom layer.

2. The 3D object printing simulator of claim 1, wherein the bottom layer comprises a number of layers that were simulated to have been deposited earlier during operation of the 3D object printing simulator.

3. The 3D object printing simulator of claim 1, wherein the layer module predicts average temperatures of a number of areas along each of the layers based on characteristics of the printing device.

4. The 3D object printing simulator of claim 1, further comprising a number of process modules communicatively coupled to the printing device controller to receive instructions from the controller describing how the 3D object is to be built.

5. The 3D object printing simulator of claim 1, wherein the layer module is to simulate heat transfer from a plurality of layers in the 3D object to be printed based on at least a density of the plurality of layers.

6. The 3D object printing simulator of claim 5, further comprising a number of process modules to receive instructions describing how a simulated 3D object is to be printed and generate a number of action signals describing how the layers module is to simulate a 3D object printing process.

7. The 3D object printing simulator of claim 5, wherein the layer module partitions the number of layers in the 3D object to be printed in to a surface layer, a number of intermediate layers, and a bottom layer.

8. The 3D object printing simulator of claim 7, wherein the layer module simulates application of a sinterable material and a binding agent onto each of the number of layers accumulated on a supply bed of a 3D printing device.

9. The 3D object printing simulator of claim 8, wherein the layer module simulates average area temperature of an area of at least one of the layers where a binding agent has been applied.

10. The 3D object printing simulator of claim 9, wherein the layer module simulates average area temperature of an area of at least one of the layers where a binding agent has not been applied.

11. The 3D object printing simulator of claim 10, wherein the simulated average area temperatures of the areas of at least one of the layers where a binding agent has and has not been applied is converted into simulated sensors readings and sent to a processor of the printing device.

12. A method of simulating the printing of a three-dimensional (3D) object with the simulator of claim 1, comprising:
receiving, at the printing device controller, a configuration file describing parameters used during a 3D object printing process, an environment file describing characteristics of a sinterable material to be used during the 3D printing process, and a 3D object image file describing a number of layers of the 3D object;
with the printing device controller, simulating printing of the 3D object;
with the printing device controller, generating layer temperature data, density data, and execution time of the 3D printing process.

13. The method of claim 12 further comprising providing real time simulated temperature readings of each of the number of layers to the controller while simulating the printing of the 3D object.

14. The 3D object printing simulator of claim 1, wherein the printing device controller adjusts one of the following for the 3D object printing process: a speed of a component in the printing device, a type of build material used, a type or amount of radiation applied, and a cooling period between forming different layers.

15. The 3D object printing simulator of claim 1, wherein the layer module is to use a different model to simulate a first internal layer and a second internal layer.

16. The 3D object printing simulator of claim 1, the simulator further to provide a graphical user interface representing temperatures for each portion of each layer during a simulated fabrication process.

17. The 3D object printing simulator of claim 1, the simulator further to indicate a fabrication time for each layer based on simulation of forming the object.

18. A three-dimensional (3D) object printing process-level simulator, comprising:
a layer module for modeling a plurality of layers of a simulated 3D object to be built; and a printing device controller to receive a number of simulated continuous values from the layer module to simulate a 3D object printing process and adjust the 3D object printing process based on physical characteristics of a printing device associated with the printing device controller;

wherein the printing device controller provides action commands to the layer module describing how a layer among the number of layers is to be preheated, fused, and recoated and how a binding agent is to be applied to each layer.

19. A three-dimensional (3D) object printing process-level simulator, comprising:

a layer module for modeling a plurality of layers of a simulated 3D object to be built; and a printing device controller to provide characteristics of a printing device associated with the printing device controller to the layer module as parameters in modeling the plurality of layers and simulating printing of the 3D object by the layer module, the printing device controller further to receive a number of simulated continuous values from the layer module to simulate a 3D object printing process and adjust the 3D object printing process for execution by the printing device associated with the printing device controller;

the simulator further to provide a graphical user interface representing part area density for each part of the object being fabricated.

* * * * *